(12) United States Patent
Florean

(10) Patent No.: US 8,061,469 B2
(45) Date of Patent: Nov. 22, 2011

(54) DEVICE FOR CONTROLLING THE STEERING OF A COMMERCIAL VEHICLE, AND VEHICLE COMPRISING ONE SUCH DEVICE

(75) Inventor: Gilles Florean, Belley (FR)

(73) Assignee: Volvo Compact Equipment SAS, Belley (FR)

( * ) Notice: Subject to any disclaimer, the term of this patent is extended or adjusted under 35 U.S.C. 154(b) by 589 days.

(21) Appl. No.: 11/917,696

(22) PCT Filed: Jun. 14, 2005

(86) PCT No.: PCT/FR2005/050444
§ 371 (c)(1),
(2), (4) Date: Apr. 4, 2008

(87) PCT Pub. No.: WO2006/134239
PCT Pub. Date: Dec. 21, 2006

(65) Prior Publication Data
US 2009/0000854 A1    Jan. 1, 2009

(51) Int. Cl.
*B62D 7/15*    (2006.01)
(52) U.S. Cl. .......... 180/410; 180/415; 180/434
(58) Field of Classification Search .......... 180/408–411, 180/414, 415, 421, 422, 434, 442
See application file for complete search history.

(56) References Cited

U.S. PATENT DOCUMENTS

| 4,917,204 A | 4/1990 | Andrew et al. | |
|---|---|---|---|
| 5,139,105 A | 8/1992 | Frost et al. | |
| 5,195,603 A | 3/1993 | Sugiyama et al. | |
| 5,417,299 A * | 5/1995 | Pillar et al. ..................... | 180/412 |
| 5,526,891 A * | 6/1996 | Goloff .......................... | 180/415 |
| 5,609,221 A | 3/1997 | Endsley et al. | |

FOREIGN PATENT DOCUMENTS

| DE | 4423585 A1 | 1/1995 |
|---|---|---|
| JP | 55004226 A | 1/1980 |

* cited by examiner

*Primary Examiner* — Anne Marie M Boehler
(74) *Attorney, Agent, or Firm* — Novak Druce + Quigg LLP

(57) ABSTRACT

The disclosed device controls the steering of a commercial vehicle and comprises front wheels that can be oriented according to a first turning angle by a first actuator, rear wheels oriented according to a second turning angle by a second actuator, and a power circuit with a pressurized fluid source and power components that transmit hydraulic power to the actuators. The power components are controllable to configure the power circuit according to coupling modes between the front and rear wheels. The device includes a control circuit containing a power source and control components that are electrically controlled by an electrical control unit and transmit hydraulic commands relating to one of the determined coupling modes to the power components. The control components are hydraulically connected such that in the event of a fault in the electrical control, the commands permanently maintain the power circuit in the current coupling mode.

24 Claims, 3 Drawing Sheets

DEVICE FOR CONTROLLING THE STEERING OF A COMMERCIAL VEHICLE, AND VEHICLE COMPRISING ONE SUCH DEVICE

FIELD OF THE INVENTION

The subject of the invention relates to a steering control device for a commercial vehicle, in particular of the type comprising a hydraulic actuator for modifying the turning angle of the wheels of the vehicle. The present invention also pertains to a commercial vehicle equipped with such a steering control device.

In a manner known per se, the turning of the wheels is operated, during rotation, by an action on each wheel stub axle, exerted directly by the actuator or, more generally by one or more transmission parts. The actuator is often of hydraulic type, such as a double-action ram acting on each wheel stub axle.

PRIOR ART

In the field of commercial vehicles, it is often necessary to envisage various modes of operation of the wheel steering control device, in particular to allow the vehicle to follow demanding trajectories, for example with very small radius of curvature or when transporting bulky merchandise. Numerous other constraints exist on worksites or in companies which require alterable and very handleable vehicles.

This is why certain steering devices of the prior art allow vehicle operation according to various modes of coupling between the front wheels and the rear wheels. The conventional mode of coupling is known, in which two front wheels are steerable. In certain cases, it is useful to have four steerable wheels. To improve the turning capability, the rear wheels can be orientable concomitantly and in the opposite sense to the front wheels. In certain cases, worksite constraints may necessitate a so-called "crab" movement, that is to say in which the rear wheels are orientable concomitantly and parallel with the front wheels. This may be relevant for example in maneuvers for following embankments or the like.

To effect these various modes of coupling, numerous steering devices of the prior art exhibit a hydraulic circuit ensuring the supply for the various actuators. This circuit can be configured by the driver of the vehicle according to the mode of coupling chosen. This configuration is effected by means of electric valves permitting the flow of a fluid able to transmit the power and the controls to the actuators modifying the turning angle of the wheels, according to the various possible modes of coupling.

However, these hydraulic-power actuators are controlled by electrical signals. Therefore, when there is an electrical failure in the control of the electric valves, the vehicle may suddenly change coupling mode thus causing an abrupt change of direction of the wheels, so reducing the handleability of the vehicle and leading to a dangerous situation for the driver. Thus, a vehicle may switch abruptly from a mode with two steerable wheels to a "crab" mode of coupling. Such an electrical failure may consist for example of a break in the electrical supply, due to wear or the severing of a wire, but also very simply to a flat battery, to a failure of an alternator or coil.

To avoid this problem, documents U.S. Pat. Nos. 4,917,204 and 5,139,105 describe vehicles equipped with steering devices selectively permitting two modes of coupling between the front wheels and the rear wheels and provided with means of mechanical locking able to maintain the current mode of coupling despite an electrical failure.

However, the means of mechanical locking must necessarily exhibit the appropriate dimensions and functional play for the relative movements of the parts. Now, this play may give rise to play in the turning angle and thus induce a slight beat of the steerable wheels, which makes driving less precise and less pleasant. Moreover, these means of mechanical locking are specific to this application. They therefore represent a relatively expensive and poorly reproducible solution, thus making repairs tricky.

DESCRIPTION OF THE INVENTION

The object of the invention is therefore to propose a reliable steering control device, in particular able to maintain the commands addressed to the actuators so as to enduringly preserve the current mode of coupling of the front wheels with the rear wheels.

The invention therefore relates to a steering control device for a commercial vehicle comprising in a known manner:
two front wheels capable of being oriented according to a first turning angle by means of at least one first actuator,
two rear wheels capable of being oriented according to a second turning angle by means of at least one second actuator,
a power circuit comprising a pressurized fluid source and power components able to transmit the hydraulic power to the actuators, the power components being capable of being controlled so as to configure the power circuit according to various modes of coupling of the said front wheels with the said rear wheels.

According to the invention, the steering control device comprises a control circuit, comprising a pressurized fluid source and control components driven electrically by an electrical control unit. The control components are able to transmit hydraulic control commands to the power components, said commands being specific to one of the modes of coupling determined. These control components are hydraulically connected in such a way that, should a fault arise at the level of an electrical drive of the control components, the hydraulic control commands are maintained so as to enduringly maintain the configuration of the said power circuit according to the current mode of coupling of the said front wheels with the said rear wheels.

Stated otherwise, should there be an electrical failure, the steering control device which is the subject of the invention exhibits connections of the control and power circuits that are such that the vehicle can operate in degraded mode, in which no new command is transmitted by the power components responsible for the configuration of the circuit. The hydraulic power components therefore remain in the same state before and after an electrical fault arises in driving the control components.

Stated otherwise, should electrical control be lost, the configuration of the circuit, and therefore the mode of steering ("two" or "four steerable wheels" or "crab") is preserved by the permanence of the hydraulic commands received by the power components.

In practice, the control components can hydraulically drive the power components so as to configure the power circuit according to a mode of coupling in which only the front wheels are orientable while the turning angle of the rear wheels remains zero, that is to say fixed and along the principal axis of the vehicle. Such a device thus effects the mode of coupling with the two front wheels as sole steerable wheels.

In an advantageous manner, the control components can hydraulically drive the power components so as to configure the power circuit according to a mode of coupling in which the rear wheels are orientable concomitantly and parallel with the front wheels. The mode of coupling thus obtained corresponds to the "crab" movement of the vehicle, that is to say at least partially according to a lateral direction.

Preferably, the control components and the power components can be connected hydraulically so as to configure the power circuit according to a mode of coupling in which the rear wheels are orientable concomitantly and in the opposite sense to the front wheels, the direction of the rear wheels forming with the principal axis of the vehicle an angle complementary to the angle formed by the front wheels on the principal axis of the vehicle. This is then the mode of coupling with four steerable wheels, the rear wheels contributing to accentuate the curvature of the trajectory followed by the vehicle.

In practice, the steering control device can furthermore comprise a selection member allowing the driver of the vehicle to select one of the modes of coupling of the front wheels with the rear wheels. Such a selection member having several positions allows the driver to choose the mode of coupling, therefore of driving, best suited to the trajectory that he must give the vehicle.

According to a practical embodiment of the invention, the assembly of control components of the steering control device comprises:

- two normally closed monostable control distributors with electrical drive and exhibiting two orifices and two positions, the distributors being connected to at least one pressurized fluid source,
- two normally open monostable control distributors with electrical drive and exhibiting three orifices and two positions, each of the distributors being linked to two of the power components so as to transmit hydraulic commands to them, each of the normally open control distributors being mounted in series with each of the normally closed control distributors, each normally open control distributor being connected to an exhaust duct,
- a hydraulic circuit selector able to carry out an "OR" function and mounted in parallel with the two normally open control distributors.

Stated otherwise, the assembly of components comprises two parallel sub-assemblies each comprising a normally closed electric valve and a distributor with normally open exhaust, each sub-assembly being assigned to a side of the vehicle. These four components are capable of being brought back to the rest position under the action of a restoring means. The two sub-assemblies are connected to a hydraulic circuit selector carrying out an "OR" function.

In a practical embodiment, the assembly of power components comprises five monostable power distributors controlled hydraulically by the control distributors exhibiting two orifices and two positions. Stated otherwise, the control electric valves control power hydraulic valves.

In practice, the steering control device exhibits the following characteristics:

- the first and second actuators each comprise a double-action ram possessing two rods and exhibiting two actuation chambers separated by a piston and capable of receiving the power transmission fluid,
- at least four hydraulic ducts link the actuation chambers pairwise, each duct linking the first actuator to the second actuator and each of the chambers being connected to at least two of the ducts,
- each of the ducts is equipped with a valve consisting of one of the normally closed mounted power distributors,
- a hydraulic duct equipped with the fifth normally open mounted power distributor is connected to each of the four hydraulic ducts, so as to isolate them into two groups of two ducts.

Advantageously, for a determined position of the selection member, the control components do not transmit any hydraulic command to the five power distributors, the power distributors thus being in the rest position, closed, so as to configure the power circuit according to the first mode of coupling. This position of the selection member configures the power circuit according to the mode with two steerable wheels.

Preferably, for one or the other of two determined positions of the selection member, the fifth power distributor and two of the other power distributors receive hydraulic commands transmitted by the control components, so as to make it possible to configure the power circuit selectively according to one of the second or third modes of coupling. These other two positions of the selection member configure the power circuit according to the "crab" or four steerable wheels mode.

Furthermore, multiple commercial vehicles can therefore be equipped with the steering control device according to the invention. Such a vehicle can therefore be steered in a particularly reliable manner according to at least three modes of coupling of the wheels.

BRIEF DESCRIPTION OF THE FIGURES

The way in which the invention may be carried out and the advantages stemming therefrom, will emerge better from the exemplary embodiment which follows, given by way of non-limiting indication in support of the appended figures.

DETAILED EMBODIMENT OF THE INVENTION

Figure 1:
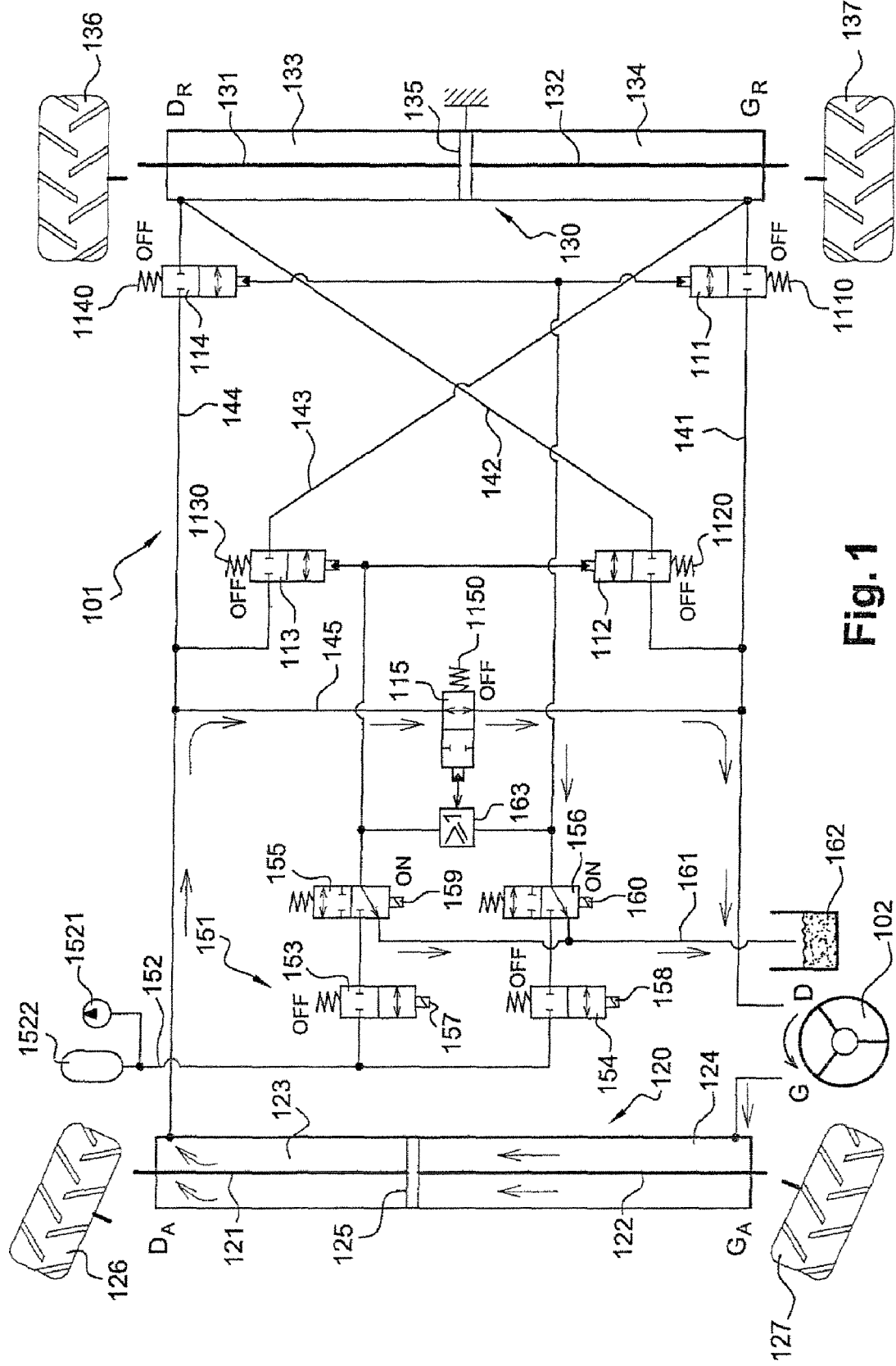
FIG. 1 represents in a diagrammatic manner a steering control device in accordance with the present invention and controlled according to a first mode of coupling, with two steerable wheels.

FIG. 1 shows a steering control device for a commercial vehicle comprising a first actuator 120 able to orient the two front wheels 126, 127 almost parallel to one another, that is to say practically at the same angle, to within the approximation of the radii of curvature of the trajectories of the two wheels which differ very slightly. The device also comprises a second actuator 130 able to orient the two rear wheels 136, 137 parallel to one another, and a power circuit 101 supplied by a pressurized fluid source known per se (not represented). In the form illustrated, each of the two actuators 120, 130 is composed of a double-action ram possessing two rods 121, 122; 131, 132 and exhibiting two actuation chambers 123, 124; 133, 134 separated by a piston 125; 135 and capable of receiving the power transmission fluid. Additionally, it is also possible to envisage one double-action ram per wheel, or else a ram driving a single wheel and a linkage device transmitting the motion of the rod of the ram to the second wheel of the train.

In the power circuit 101, the fluid is set into motion by means of an action on a steering wheel 102 with the aim of turning right or left. The power fluid can circulate through four hydraulic actuation ducts 141, 142, 143, 144, which link the actuation chambers 123, 124; 133, 134 pairwise. Moreover, each duct 141, 142, 143, 144 links the first ram 120 to the second ram 130 and each of the chambers is connected to two of the ducts 141, 142, 143, 144. Furthermore, an isolation hydraulic duct 145 is connected to each of the four hydraulic ducts 141, 142, 143, 144, so as to allow isolation into two groups of two ducts 141, 142 and 143, 144.

The power circuit 101 furthermore comprises five power components for controlling the circulation of the power fluid in the ducts 141, 142, 143, 144. These components consist of power distributors with two orifices and two positions, stated otherwise monostable hydraulic valves, and are dimensioned in a manner known per se so as to be able to transmit the hydraulic power to the actuators 120, 130. Four of the power valves constituting the power components are envisaged normally closed 111, 112, 113, 114 and act as actuation valves while a fifth valve is envisaged normally open 115 which acts as an isolation valve between two groups of two actuation ducts 141, 142; 143, 144. As indicated above, the five power valves 111, 112, 113, 114, 115 are monostable, on account of the restoring to the rest position of each by a restoring means 1110, 1120, 1130, 1140, 1150.

Thus, the circulation of the power fluid in each of the five power ducts 141, 142, 143, 144, and, so, the mode of coupling between the front and rear wheels, is dependent on the opening or closing states of the five power valves 111, 112, 113, 114, 115, therefore the manner in which these five valves are controlled.

As illustrated by FIG. 1 and in accordance with the invention, the control members of the five power valves 111, 112, 113, 114, 115 are connected hydraulically to control components, which are linked together so as to form a control circuit 151. The components of the control circuit 151 consist of hydraulic distributors capable of being controlled so as to configure the said power circuit 101 according to various modes of coupling. These control components are driven electrically by an appropriate electrical control unit (not represented) and are connected to a pressurized fluid source 152 advantageously comprising a hydraulic pump 1521 and a hydraulic accumulator 1522. They consist additionally of:

two normally closed monostable control distributors 153, 154 with electrical drives 157, 158 and exhibiting two orifices and two positions, commonly dubbed electric valves, two normally open monostable control distributors 155, 156 with electrical drives 159, 160 and exhibiting three orifices and two positions, that is to say electric valves with an exhaust duct 161, which links the control circuit to a reservoir at lower pressure than the pressure of the hydraulic commands, a hydraulic circuit selector 163 able to carry out an "OR" function and mounted in parallel with the two normally open control distributors 155, 156.

The control circuit 151 is arranged in such a way that each of the distributors 153, 154; 155, 156 is linked to two of the five power valves 111, 112, 113, 114, 115 so as to transmit hydraulic commands to them, thus controlling the state of opening of the power valves 111, 112, 113, 114, 115.

Each of the normally open distributors 155, 156 is mounted in series with a normally closed electric valve 153, 154, and is moreover connected to a common exhaust duct 161 leading to a reservoir 162 at lower pressure than the pressure of the hydraulic commands, for example at atmospheric pressure.

The pressure of the exhaust duct 161 thus provides a reference for the low state of the control. The control components 153, 154, 155, 156, 163 thus connected are able to transmit hydraulic control commands to the power components by way of the control oil 111, 112, 113, 114, 115, which commands are specific to each mode of coupling.

Thus, the steering control device set forth in conjunction with the figures can be configured according to three different modes of coupling of the front and rear wheels: FIG. 1 illustrates the mode with two steerable front wheels, FIG. 2 the "crab" mode, where the front and rear wheels are oriented concomitantly and in parallel, and FIG. 3 the mode with four steerable wheels, where the front and rear wheels are oriented concomitantly and in opposite senses. In each of these figures, the rise in pressure of the power and control ducts and rams 120, 130 is shown diagrammatically by arrows parallel to the ducts concerned. Moreover, in each figure, the power and control distributors are represented in their actual position as a function of the mode of coupling illustrated; furthermore, the "ON" or "OFF" states are labeled level with their control members to indicate the state of the hydraulic controls and electrical drives of the components.

Moreover, in accordance with a characteristic of the invention, the components employed combined with the connections effected such as set forth above, make it possible, should a fault arise at the level of an electrical drive of the control components 155, 156, to maintain the control commands so as to enduringly preserve the configuration of the power circuit 101 according to the current mode of coupling of the front wheels with the rear wheels. Such a steering control device thus avoids an abrupt change of the mode of coupling of the wheels, therefore of driving.

Specifically, if the electrical drive disappears, the control components 153, 154, 155, 156, 163, which are monostable, all revert to the rest position. Thus, the electric valves 153, 154 are closed while each of the distributors 155, 156 is placed in the disconnected position of the exhaust duct 161. It is readily understood, in particular in view of the figures, that the pressures, high or low, which prevail in the control ducts are then maintained and, consequently, the hydraulic commands transmitted to the power valves 113, 112, 115 too.

FIG. 1 illustrates the first mode of coupling. To effect this mode of coupling, only the two normally open control distributors 155, 156 are driven electrically by a signal emitted on their electromagnets 159, 160. The electric valves 153, 154 remain closed while the two distributors 155, 156 then assume the position of exhaust at low pressure towards the reservoir 162, no opening command then being dispatched to the four actuation power valves 111, 112, 113, 114, whose ducts 141, 142, 143, 144 remain non-passing. Likewise, the isolation valve 115 is not driven and remains in the open position maintaining the duct 145 passing.

Thus, when the driver turns the steering wheel 102 to the left, the pressure rises in the chamber 124 of the ram 120, then is transmitted by way of the piston 125 into the chamber 123, then into the sole passing duct 145, before looping towards the pressurization source (not represented). It therefore emerges from the configuration of FIG. 1 that only the front wheels are orientable and steerable, the rear wheels remaining straight, that is to say along the principal axis of the vehicle defined as straight ahead and forwards.

Figure 3:
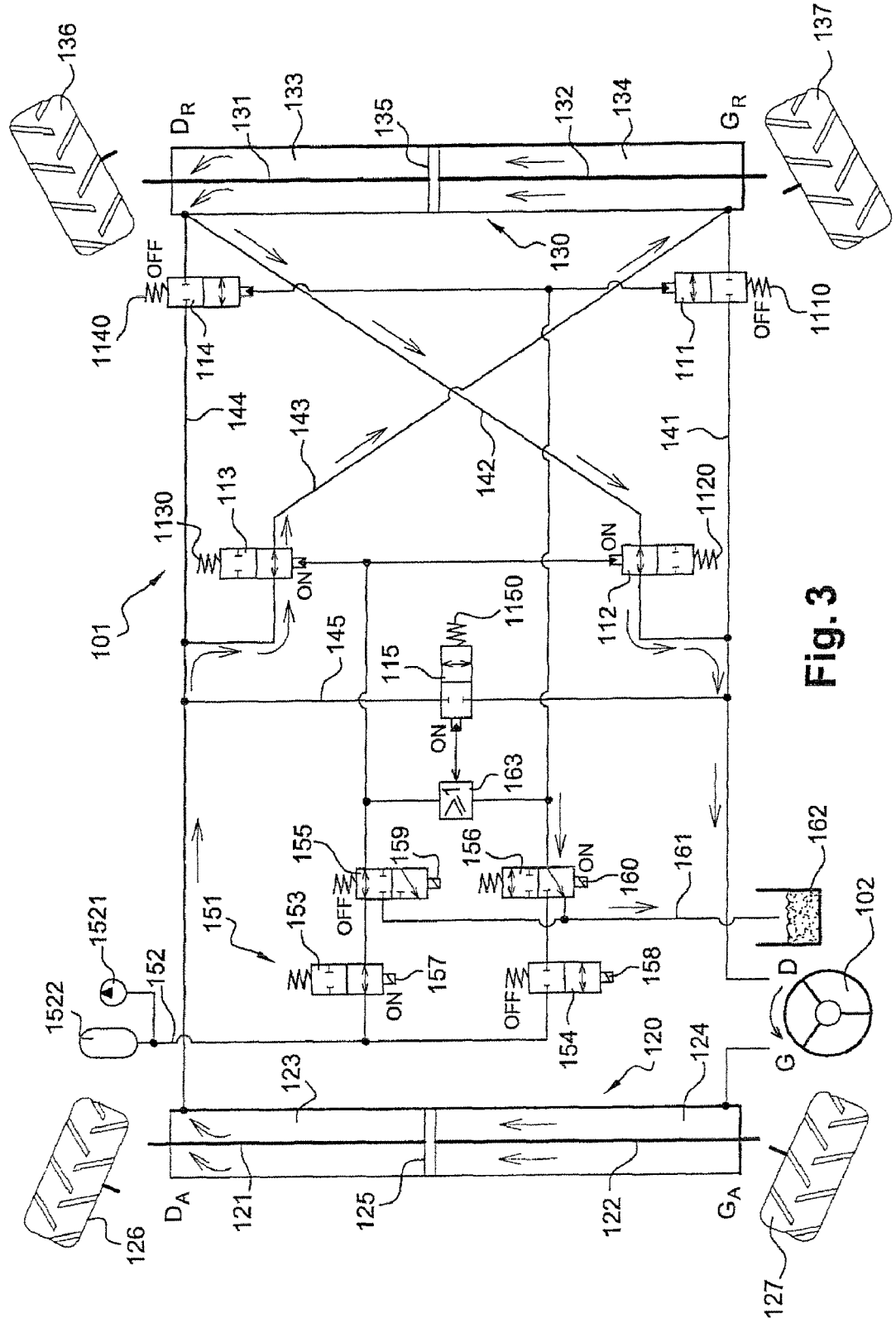
FIG. 3 represents in a diagrammatic manner the steering control device of FIG. 1, controlled according to a third mode of coupling, with four steerable wheels coupled in opposite senses.

FIG. 3 illustrates the third mode of coupling. To effect this mode of coupling, a normally open control distributor 156 and an electric valve 153 are driven electrically by a signal emitted on their electromagnets 160, 157. The other electric valve 154 remains closed while the other distributor 155 then assumes the position of exhaust at low pressure towards the reservoir 162, no opening command then being dispatched to the two actuation power valves 111, 114, whose ducts 141, 144 remain non-passing. Moreover, the isolation valve 115, driven by the distributor 155, assumes the closed position, thus blocking the duct 145.

Thus, when the driver turns to the left the steering wheel 102, or more generally a steering member, the pressure rises in the chamber 124 of the ram 120, then is transmitted to the chamber 123 by way of the piston 125, then, via the passing duct 143, to the chamber 134 of the second ram 130. The pressure is then transmitted to the chamber 133 by way of the piston 135, then, via the passing duct 142, thereafter loops towards the pressurization source (not represented). It therefore emerges from the configuration of FIG. 3 that the four wheels are steerable and orientable in opposite senses. In general, the direction of the rear wheels forms with the principal axis of the vehicle an angle complementary to the angle formed by the front wheels on the principal axis of the vehicle.

Figure 2:
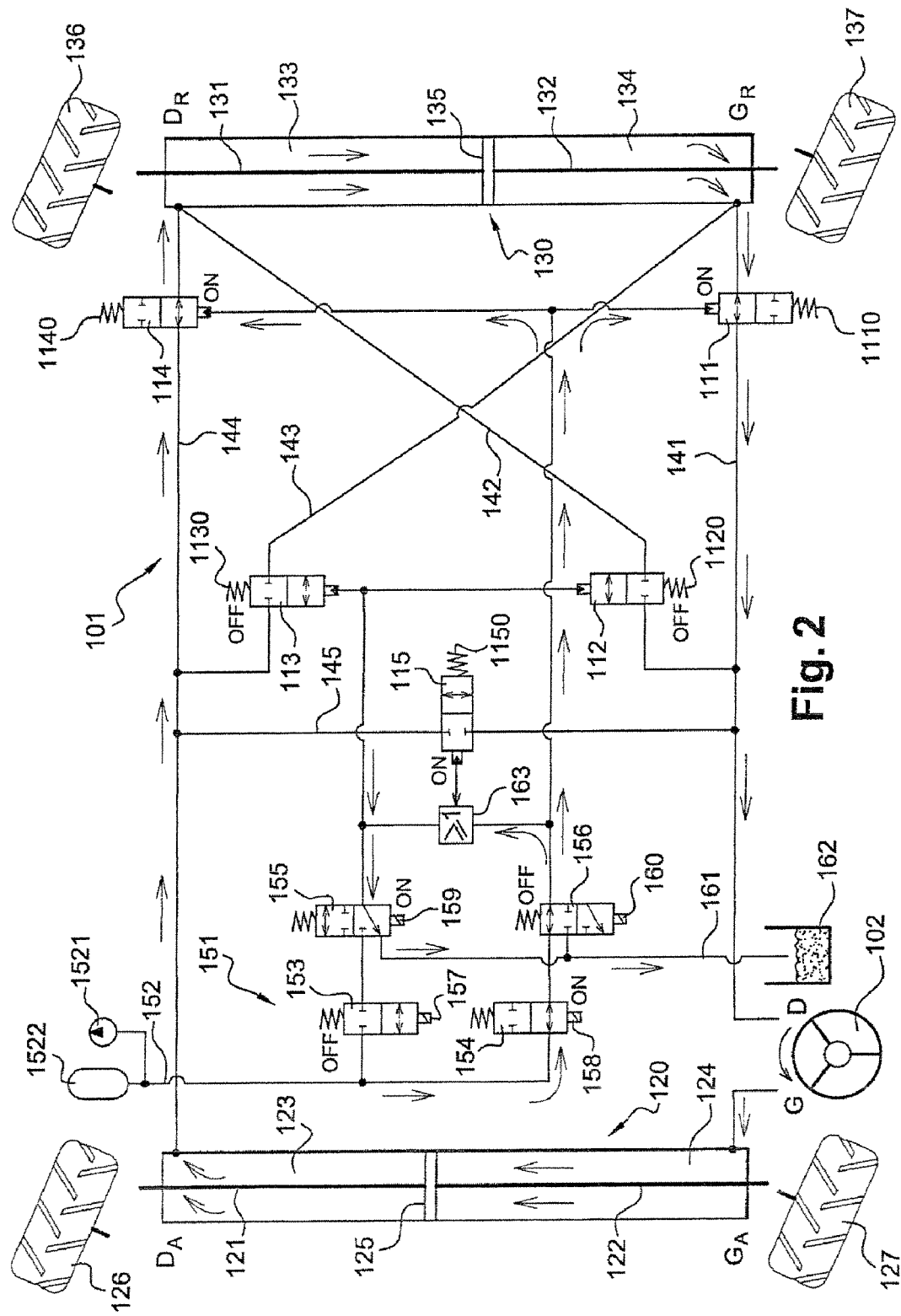
FIG. 2 represents in a diagrammatic manner the steering control device of FIG. 1, controlled according to a second mode of coupling, with four steerable wheels coupled in parallel or in "crab" mode.

FIG. 2 illustrates the second mode of coupling. To effect this mode of coupling, a normally open control distributor 155 and an electric valve 154 are driven electrically by a signal emitted on their electromagnets 159, 158. The other electric valve 153 remains closed while the other distributor 156 then assumes the position of exhaust at low pressure towards the reservoir 162, no opening command then being dispatched to the two actuation power valves 112, 113, whose ducts 142, 143 remain non-passing. Moreover, the isolation valve 115, driven by the distributor 155, assumes the closed position, thus blocking the duct 145.

Thus, when the driver turns the steering wheel 102 towards the left, the pressure rises in the chamber 124 of the ram 120, then is transmitted to the chamber 123 by way of the piston 125, then, via the passing duct 144, to the chamber 133 of the second ram 130. The pressure is then transmitted to the chamber 134 by way of the piston 135, then, via the passing duct 141, thereafter loops towards the pressurization source (not represented). It therefore emerges from the configuration of FIG. 2 that the four wheels are orientable concomitantly and in parallel, allowing a "crab" movement of the vehicle.

Should an electrical failure arise at the level of the electrical control unit (not represented) of the control circuit 151, the steering control device in accordance with the invention, having regard to its components and their connections, maintains the hydraulic commands on the power components actuated, therefore avoiding an abrupt change of mode of inter-coupling of the wheels.

Thus, the high pressure exerted on the power valves 111, 114 remains constant, to within the approximation of any slight leaks due to mechanical play, since then the control circuit is "frozen". Specifically, no control electric valve 153, 154 nor any control distributor 155, 156 is linked to the exhaust 162 or to the pressure source 152, so that the ducts of the control circuit 151 are isolated.

Specifically, if any one of the three modes of coupling described above is assumed, it is noted that the disappearance of electrical drive sends the control components 153, 154, 155, 156, 163, which are monostable, to the rest position. Thus, the electric valves 153, 154 are closed while each of the distributors 155, 156 is placed in the position disconnected from the exhaust duct 161. The pressures, high or low, which prevail in the control ducts are then maintained and, consequently, the hydraulic commands transmitted to the power valves 113, 112, 115 too.

Thus, the current mode of coupling, that is to say that which was selected before the appearance of the electrical failure, is maintained and the driver can continue to drive in complete safety. The electrical fault can consist of a break in supply, an overvoltage or any other type of fault, as indicated above. It is additionally possible to envisage that the electrical drive fault is signaled to the driver so that the latter can take the necessary repair measures to correct this fault.

As pressure source, the accumulator 1522 can replace the pump 1521 when the latter breaks down or when it ceases to be supplied. Thus, when the pump 1521 is no longer able to pressurize the control circuit 151, the accumulator 1522 can be connected, automatically or manually, to this circuit so as to take over from the pump and provisionally maintain the normal operation of the control circuit 151, therefore of the complete steering control device. The valve member situated between the accumulator 1522 and the pump 1521 is not illustrated in the figures, since the choice thereof and insertion thereof do not present any difficulty for a person skilled in the art.

Quite obviously, this accumulator 1522 can only replace the pump 1521 for a determined duration on completion of which its internal pressure is no longer sufficient to ensure the normal operation of the control circuit 151. At this instant, it becomes essential to replace the pump 1521. However, in the latter case, as was set forth in the above account, the driver can continue to use the vehicle in the current mode of coupling, on account of the construction of its control device in accordance with the present invention.

To simplify the reading of the figures, only the components essential to the understanding of the invention have been represented. This is why certain components necessary for the operation of the device have been intentionally omitted. The person skilled in the art will however have no difficulty as regards their choice and their position in the circuits, insofar as they are very common components and functions. For similar reasons, the dimensionings of the components of the control and power circuits, unnecessary for the understanding of the invention and quite within the scope of the person skilled in the art, are not detailed in this account.

Of course, other conventional hydraulic and/or electrical components can be added to the circuit according to requirements. For example, it is possible to add filters, flowrate regulators, pressure or state sensors, relief valves, etc. Likewise, it is possible to replace the control and/or power components represented in the figures with components fulfilling the same functions and, optionally, additional functions. These elementary modifications and/or additions are possible, without however departing from the framework of the invention.

The invention claimed is:

1. A commercial vehicle, comprising:
   a pair of front wheels and at least one front hydraulic steering actuator that causes the front wheels to turn according to a front-wheel steering angle;
   a pair of rear wheels and at least one rear hydraulic steering actuator that causes the rear wheels to turn according to a rear-wheel steering angle; and
   a hydraulic steering control system that regulates the front-wheel steering angle and the rear-wheel steering angle according to a first, a second, or a third selectable steering mode;
   wherein one pair of said front and rear pairs of wheels comprises mode-controlled wheels and the other pair of said front and rear pairs of wheels comprises non-mode-controlled wheels;
   wherein in the first steering mode, the mode-controlled wheels are maintained at a fixed steering angle and the non-mode-controlled wheels are able to be turned to various steering angles in response to a steering command being given;

wherein in the second steering mode, the wheels of both of said pairs are able to be turned to various steering angles and the mode-controlled wheels turn simultaneously with and in the same steering direction as the non-mode-controlled wheels in response to a steering command being given;

wherein in the third steering mode, the wheels of both of said pairs are able to be turned to various steering angles and the mode-controlled wheels turn simultaneously with and in the opposite steering direction as the non-mode-controlled wheels in response to a steering command being given; and wherein said hydraulic steering control system comprises a plurality of conduits through which hydraulic fluid can flow to and from the front and rear hydraulic steering actuators to control the steering angles of the associated pairs of wheels;

a plurality of hydraulically actuated flow control devices that control the existence of and, if it exists, the direction of hydraulic fluid flow to and from the hydraulic steering actuator associated with the mode-controlled wheels, with the existence of fluid flow to and from the hydraulic steering actuator associated with the mode-controlled wheels and, if it exists, the direction thereof being used to effect the particular steering mode that has been selected; and a plurality of monostable, electrically actuated flow control devices that control the flow of hydraulic fluid to, and hence the actuation state of, the various hydraulically actuated flow control devices, with the hydraulically actuated flow control devices to which hydraulic fluid is permitted to flow, if any, being determined by the actuation states of the various electrically actuated flow control devices and the actuation states of the various electrically actuated flow control devices being determined by which of the various steering modes has been selected;

wherein the electrically actuated flow control devices have non-energized or at-rest open/closed states and are mutually arranged such that upon loss of electrical power to them, they revert to a configuration that maintains hydraulic pressurization, if any, within hydraulic control lines leading from the electrically actuated flow control devices to the hydraulically actuated flow control devices and that hence maintains the actuation state of the hydraulically actuated flow control devices, whereby the vehicle can continue to be steered according to the selected steering mode in the event electrical power to the electrically actuated flow control devices is lost.

2. The vehicle of claim 1, wherein said plurality of conduits includes a pair of front-rear conduits that extend between said at least one front hydraulic steering actuator and said at least one rear hydraulic steering actuator; and wherein said hydraulic steering control system further comprises an isolation hydraulic conduit that extends from a mid-portion of one of said front-rear conduits to a mid-portion of the other of said front-rear conduits so as to interconnect them, which isolation hydraulic conduit includes an isolation flow controller that selectively can be closed or opened to permit hydraulic fluid to flow through the isolation hydraulic conduit depending on which of said steering modes has been selected; said isolation hydraulic conduit effectively defining within the hydraulic steering control system a pair of hydraulic circuit sub-portions with one of said pairs of wheels, and the at least one hydraulic steering actuator associated therewith, associated with each hydraulic circuit sub-portion.

3. The vehicle of claim 2, wherein the at least one hydraulic steering actuator that is associated with the mode-controlled wheels comprises a double-action ram having a piston and a chamber on each side of the piston;

wherein each of the front-rear conduits is selectively able to conduct hydraulic fluid flow from the hydraulic steering actuator associated with the non-mode-controlled wheels all the way up to the chamber on one side of the piston or all the way from said chamber on one side of the piston to the hydraulic steering actuator associated with the non-mode-controlled wheels;

wherein the hydraulic circuit sub-portion with which the mode-controlled wheels are associated includes a pair of cross-over conduits, with each of the cross-over conduits being selectively able to conduct fluid flow from a) a cross-over conduit branch-off point associated with one of the front-rear conduits, that selectively can conduct fluid flow all the way up to or from the chamber on one side of the piston, toward b) the chamber on the other side of the piston; and wherein the hydraulically actuated flow control devices selectively permit or prevent hydraulic fluid flow through the cross-over conduits and, for each of the front-rear conduits, through a portion thereof that extends between the associated cross-over conduit branch-off point and the chamber all the way up to which the front-rear conduit selectively can conduct hydraulic fluid flow.

4. The vehicle of claim 3, wherein the first steering mode is effected by opening the isolation flow controller to permit fluid flow through the isolation conduit, from one front-rear conduit to the other, and by closing the hydraulically actuated flow control devices to prevent fluid flow in the cross-over conduits and to prevent fluid flow through the front-rear conduits between the associated cross-over conduit branch-off points and the double-action ram chambers;

whereby, in response to a steering command being given, fluid circulates in the circuit sub-portion with which the non-mode-controlled wheels are associated to control the steering angle thereof, with fluid flowing 1) from the hydraulic steering actuator with which the non-mode-controlled wheels are associated along one of the front-rear conduits to the isolation hydraulic conduit; 2) through the isolation hydraulic conduit from said one of the front-rear conduits to the other front-rear conduit; and 3) back along the other front-rear conduit toward the hydraulic steering actuator with which the non-mode-controlled wheels are associated; and whereby fluid is prevented from flowing in the circuit sub-portion with which the mode-controlled wheels are associated such that the steering angle thereof remains fixed.

5. The vehicle of claim 3, wherein the second steering mode is effected by closing the isolation flow controller to prevent fluid from flowing through the isolation hydraulic conduit from one front-rear conduit to the other; by opening some of the hydraulically actuated flow control devices so as to permit hydraulic fluid flow along the length of each of the front-rear conduits; and by closing others of the hydraulically actuated flow control devices so as to prevent hydraulic fluid flow through each of the cross-over conduits;

whereby, in response to a steering command being given, fluid flows 1) along the length of one of the front-rear conduits from the actuator with which the non-mode-controlled wheels are associated to the chamber on one side of the double-action ram piston and 2) from the chamber on the other side of the double-action ram piston along the length of the other front-rear conduit back to the actuator with which the non-mode-controlled wheels are associated, such that both pairs of wheels simultaneously turn in the same direction; and fluid flow through the cross-over conduits is prevented.

6. The vehicle of claim 3, wherein the third steering mode is effected by closing the isolation flow controller to prevent fluid from flowing through the isolation hydraulic conduit from one front-rear conduit to the other; by opening some of the hydraulically actuated flow control devices so as to permit hydraulic fluid flow through each of the cross-over conduits; and by closing others of the hydraulically actuated flow control devices so as to prevent hydraulic fluid flow through each of the front-rear conduits between the associated cross-over conduit branch-off points and the double-action ram chambers up to or from which each of the front-rear conduits selectively can conduct hydraulic fluid flow;

whereby, in response to a steering command being given, fluid flows 1) along one of the front-rear conduits from the actuator with which the non-mode-controlled wheels are associated toward the chamber that is on one side of the double-action ram piston and up to which said one of the front-rear conduits selectively can conduct hydraulic fluid flow; 2) through one of the cross-over conduits from one of the cross-over conduit branch-off points and to the chamber on the opposite side of the double-action ram piston; 2) from the chamber up to which said one of the front-rear conduits selectively can conduct hydraulic fluid flow; 3) through the other cross-over conduits to the other cross-over conduit branch-off point; and 4) along the other front-rear conduit to the actuator with which the non-mode-controlled wheels are associated, such that both pairs of wheels simultaneously turn in opposite directions; and fluid flow is prevented through each of the front-rear conduits between the associated cross-over conduit branch-off points and the double-action ram chambers up to or from which each of the front-rear conduits selectively can conduct hydraulic fluid flow.

7. The vehicle of claim 3, wherein a hydraulically actuated flow control device is operatively disposed 1) within each of the front-rear conduits between the associated cross-over conduit branch-off point and the chamber up to which the front-rear conduit selectively can conduct hydraulic fluid flow; and 2) within each of the cross-over conduits.

8. The vehicle of claim 7, wherein the hydraulic control lines leading from the electrically actuated flow control devices to the hydraulically actuated flow control devices comprise a pair of hydraulic control lines arranged in parallel, with one of the hydraulic control lines being arranged to control actuation of the hydraulically actuated flow control devices that are operatively disposed within the front-rear conduits and the other hydraulic control line being arranged to control actuation of the hydraulically actuated flow control devises that are operatively disposed within the cross-over conduits.

9. The vehicle of claim 8, wherein there is a pair of electrically actuated flow control devices disposed in series within each of the hydraulic control lines, with an upstream one of the pair of electrically actuated flow control devices in each of the hydraulic control lines, relative to a pressurization direction, being normally closed and a downstream one of the pair of electrically actuated flow control devices in each of the hydraulic control lines, relative to the pressurization direction, being normally open; and with the downstream, normally open electrically actuated flow control device of each pair being linked to an exhaust conduit such that it is selectively able, depending on the actuation state thereof, to vent fluid from the hydraulic control line in which it is disposed.

10. The vehicle of claim 8, wherein the isolation flow controller in the isolation hydraulic conduit is hydraulically actuated and has a normally open configuration.

11. The vehicle of claim 10, wherein the actuation state of the isolation flow controller is controlled by a hydraulic circuit selector, which hydraulic circuit selector is operatively disposed between the two hydraulic control lines and is able to perform a logical "OR" function such that 1) if neither of the hydraulic control lines is pressurized, the isolation flow controller remains non-actuated and open; and 2) if either one or the other, but not both, of the hydraulic control lines is pressurized, the isolation flow controller is actuated and closes.

12. The vehicle of claim 2, further comprising a steering command input device that is operatively disposed along one of said front-rear conduits.

13. A steering control device for a commercial vehicle, comprising:

two front wheels capable of being oriented according to a first turning angle by means of at least one first actuator, two rear wheels capable of being oriented according to a second turning angle by means of at least one second actuator, and a power circuit comprising a pressurized fluid source and power components able to transmit hydraulic power to the actuators, the power components being capable of being controlled so as to configure the power circuit according to first, second, and third modes of coupling of the front wheels with the rear wheels, wherein said steering control device further comprises a control circuit comprising a pressurized fluid source and control components driven electrically by an electrical control unit, with the control components being able to transmit hydraulic control commands to the power components and the commands being specific to one of the first, second, and third modes of coupling determined, and wherein the control components are hydraulically connected in such a way as to comprise two parallel sub-assemblies with a hydraulic circuit selector carrying out an "OR" function and connected hydraulically to the two parallel sub-assemblies so as to be able to transmit a command making it possible to configure the power circuit according to one of the second and third modes of coupling of the front wheels with the rear wheels, the control components being restored, should a fault arise at the level of an electrical drive of the control components, to a rest position in which the control commands are maintained so as to enduringly maintain the configuration of the power circuit according to a current mode of coupling of the front wheels with the rear wheels.

14. The device as claimed in claim 13, wherein the control components can hydraulically drive the power components so as to configure the power circuit according to the first mode of coupling in which only the front wheels can be oriented while the turning angle of the rear wheels remains zero along the principal axis of the vehicle.

15. The device as claimed in claim 13, wherein in the second mode of coupling, the rear wheels can be oriented concomitantly with and in the same sense as the front wheels.

16. The device as claimed in claim 13, wherein in the third mode of coupling, the rear wheels can be oriented concomitantly with and in the opposite sense as the front wheels.

17. The device as claimed in claim 13, further comprising a selection member allowing the driver of said vehicle to select one of the modes of coupling of the front wheels with the rear wheels.

18. The device as claimed in claim 13, wherein the control components comprise
- two normally closed monostable control distributors with electrical drives and exhibiting two orifices and two positions, said normally closed distributors being connected to at least one pressurized fluid source; and
- two normally open monostable control distributors with electrical drives and exhibiting three orifices and two positions, with each of said normally open distributors being linked to two of said power components so as to transmit hydraulic commands to them; with each of the normally open control distributors and one of the normally closed control distributors being mounted in series with one another within one of the parallel sub-assemblies; and with each normally open control distributor being connected to an exhaust duct;
- wherein the hydraulic circuit selector that is able to carry out an "OR" function is mounted in parallel with the two normally open control distributors.

19. The device as claimed in claim 13, wherein the power components comprise five monostable power distributors controlled hydraulically by the normally open control distributors.

20. The device as claimed in claim 19, wherein each of the first and second actuators comprises a double-action ram having two rods and two actuation chambers that are separated by a piston and that are capable of receiving the power transmission fluid;
- at least four hydraulic ducts link the actuation chambers pairwise, with each duct linking the first actuator to the second actuator and each of the chambers being connected to at least two of the ducts;
- each of the ducts has a valve provided by one of the normally closed power distributors; and
- a hydraulic duct equipped with the fifth normally open power distributor is connected to each of the four hydraulic ducts so as to isolate them into two groups of two ducts.

21. The device as claimed in claim 20, wherein for a determined position of the selection member, the control components do not transmit any hydraulic command to the five power distributors, the power distributors thus being in their rest positions and closed so as to configure the power circuit according to the first mode of coupling.

22. The device as claimed in claim 20, wherein for one or the other of two determined positions of the selection member, the fifth power distributor and two of the other power distributors receive hydraulic commands transmitted by the control components so as to make it possible to configure the power circuit selectively according to one of the second or third modes of coupling.

23. A commercial vehicle equipped with a steering control device according to claim 13.

24. A commercial vehicle, comprising:
- a pair of front wheels and at least one front hydraulic steering actuator that causes the front wheels to turn according to a front-wheel steering angle;
- a pair of rear wheels and at least one rear hydraulic steering actuator that causes the rear wheels to turn according to a rear-wheel steering angle; and
- a hydraulic steering control system that regulates the front-wheel steering angle and the rear-wheel steering angle according to one of a plurality of selectable steering modes, with the ability of the front and rear wheels to turn in response to a steering command, and the relation with which the front and rear wheels turn relative to each other when both sets are steerable, being a function of the steering mode that has been selected;
- wherein said hydraulic steering control system comprises
  - a plurality of conduits through which hydraulic fluid can flow to and from the front and rear hydraulic steering actuators to control the steering angles of the associated pairs of wheels;
  - a plurality of hydraulically actuated flow control devices that control the existence of and, if it exists, the direction of hydraulic fluid flow to and from the hydraulic steering actuator associated with one of the pairs of wheels, with the existence of fluid flow to and from the hydraulic steering actuator associated with said one of the pairs of wheels and, if it exists, the direction thereof being a function of the particular steering mode that has been selected; and
  - a plurality of monostable, electrically actuated flow control devices that control the flow of hydraulic fluid to, and hence the actuation state of, the various hydraulically actuated flow control devices, with the hydraulically actuated flow control devices to which hydraulic fluid is permitted to flow, if any, being determined by the actuation states of the various electrically actuated flow control devices and the actuation states of the various electrically actuated flow control devices being a function of which of the various steering modes has been selected; and
- wherein the electrically actuated flow control devices have non-energized or at-rest open/closed states and are mutually arranged such that upon loss of electrical power to them, they revert to a configuration that maintains hydraulic pressurization, if any, within hydraulic control lines leading from the electrically actuated flow control devices to the hydraulically actuated flow control devices and that hence maintains the actuation state of the hydraulically actuated flow control devices, whereby the vehicle can continue to be steered according to the selected steering mode in the event electrical power to the electrically actuated flow control devices is lost.

* * * * *